US008983656B1

(12) United States Patent
Sternowski

(10) Patent No.: US 8,983,656 B1
(45) Date of Patent: Mar. 17, 2015

(54) ELECTROMECHANICAL DROP SENSOR FOR A VENDING MACHINE

(71) Applicant: Softronics, Ltd., Marion, IA (US)

(72) Inventor: Robert Sternowski, Cedar Rapids, IA (US)

(73) Assignee: Softronics, Ltd., Marion, IA (US)

( * ) Notice: Subject to any disclaimer, the term of this patent is extended or adjusted under 35 U.S.C. 154(b) by 218 days.

(21) Appl. No.: 13/833,414

(22) Filed: Mar. 15, 2013

Related U.S. Application Data

(60) Provisional application No. 61/750,176, filed on Jan. 8, 2013.

(51) Int. Cl.
*G07F 9/02* (2006.01)
*G06Q 20/20* (2012.01)

(52) U.S. Cl.
CPC ................ *G06Q 20/20* (2013.01); *G07F 9/026* (2013.01)
USPC ............................................... 700/244; 221/2

(58) Field of Classification Search
CPC .......... G07F 11/005; G07F 9/026; G07F 9/02
USPC .................................. 221/2, 4, 7, 9; 700/244
See application file for complete search history.

(56) References Cited

U.S. PATENT DOCUMENTS 5,651,476 A * 7/1997 Percy et al. .................. 221/131
5,927,539 A * 7/1999 Truitt et al. ....................... 221/2
6,708,079 B2 3/2004 Mason, II
7,191,034 B2 3/2007 Whitten et al.
7,255,246 B2 * 8/2007 Bautista et al. ............... 221/133
7,286,901 B2 * 10/2007 Whitten et al. ............... 700/244

* cited by examiner

*Primary Examiner* — Timothy Waggoner
(74) *Attorney, Agent, or Firm* — Jason R. Sytsma; Shuttleworth & Ingersoll, PLC

(57) ABSTRACT

An electro-mechanical vend-sensing system includes at least one biased member mounted on a side of the vend space having a first potential voltage. A contact strip with a second potential voltage is positioned beneath the biased member. A controller circuit senses when the biased member contacts the contact strip, which indicates that a article has been appropriately vended to the customer.

20 Claims, 6 Drawing Sheets

ELECTROMECHANICAL DROP SENSOR FOR A VENDING MACHINE

This application claim priority to U.S. Provisional Patent Application No. 61/750,176, the contents of which are incorporated by reference into the present application.

FIELD

The present invention relates to machines that dispense selected articles, and more particularly, to a sensing system that reliably detects dispensed articles.

BACKGROUND

Glass front vending machines are machines designed for vending articles of various sizes and shapes, including packaged snack foods, merchant cards, and consumer articles. These machines generally have a selector panel, located off to one side of the glass front, and use some form of horizontal trays, partitioned into columns, to store the articles to be vended.

Typically, after a consumer makes the requisite payment and enters the desired selection on the selector panel, the forward-most article from the selected column is ejected or dislodged, and the article drops freely into a delivery hopper at the bottom of the machine. The space that the article falls through is the area between the fronts of the columns and the back of the glass front, commonly referred to as the vend space.

It is important that vending machines operate in a reliable manner and provide consumers with the selected article without the need to expend unusual effort to obtain the article. With this said, there exists various events that can compromise the reliability of vending machine operations. For example, the spatial orientation and wrinkling of packages, the content distribution of packages, the tumbling of packages through the vend space, and empty spiral pockets can all contribute to the mis-vending of articles.

Various detection schemes have been employed to detect when an article passes through the vend space. These all suffer from various shortcomings, including failing to detect smaller articles that escape through an electromagnetic beam or multiple beams or failing to impart sufficient force on impact or vibration on a sensor located at the bottom of the vend space.

SUMMARY

The present invention discloses an electromechanical vend-sensing system. The system includes at least one biased member mounted on a side of the vend space having a first potential voltage. A contact strip with a second potential voltage is positioned beneath the biased member. A controller circuit senses when the biased member contacts the contact strip, which indicates that an article has been appropriately vended to the customer.

In an embodiment multiple biased members are provided in order to obstruct the vend space. The biased members can be straight or bent, or the biased members can be arranged in a linear or overlapping pattern. An important aspect is that the biased members are sufficiently close together to prevent an article from slipping past without impacting the biased members yet flex downward from the weight of the article so that the article can pass through the vend space to the customer.

These and other aspects, features, and advantages of the invention will become apparent upon review of the following description taken in connection with the accompanying drawings. The invention, though, is pointed out with particularity by the appended claims.

DETAILED DESCRIPTION

The present invention is directed to a vend-sensing system that reliably detects when an article has been dispensed. This can be achieved by providing at least one biased member that is deflected by an article downward to touch a contact strip to close an electrical circuit. The biased member(s) are sufficiently sized to span the cross-sectional area of the vend space and are configured to have an inter-member spacing small enough to detect the smallest article being dispensed.

When an article is released, it falls through the vend space, deflects the biased member(s), and a detector senses the closed circuit. The detector subsequently signals that the article has been dispensed. A machine control unit receives the signal and terminates the vending cycle. If, during the vending cycle, the machine control unit fails to receive the signal from the detector, the machine control unit initiates a corrective action. In this manner, the vend-sensing system of the present invention is capable of reliably detecting dispensed articles and taking appropriate corrective action when an article is mis-vended.

Figure 1:
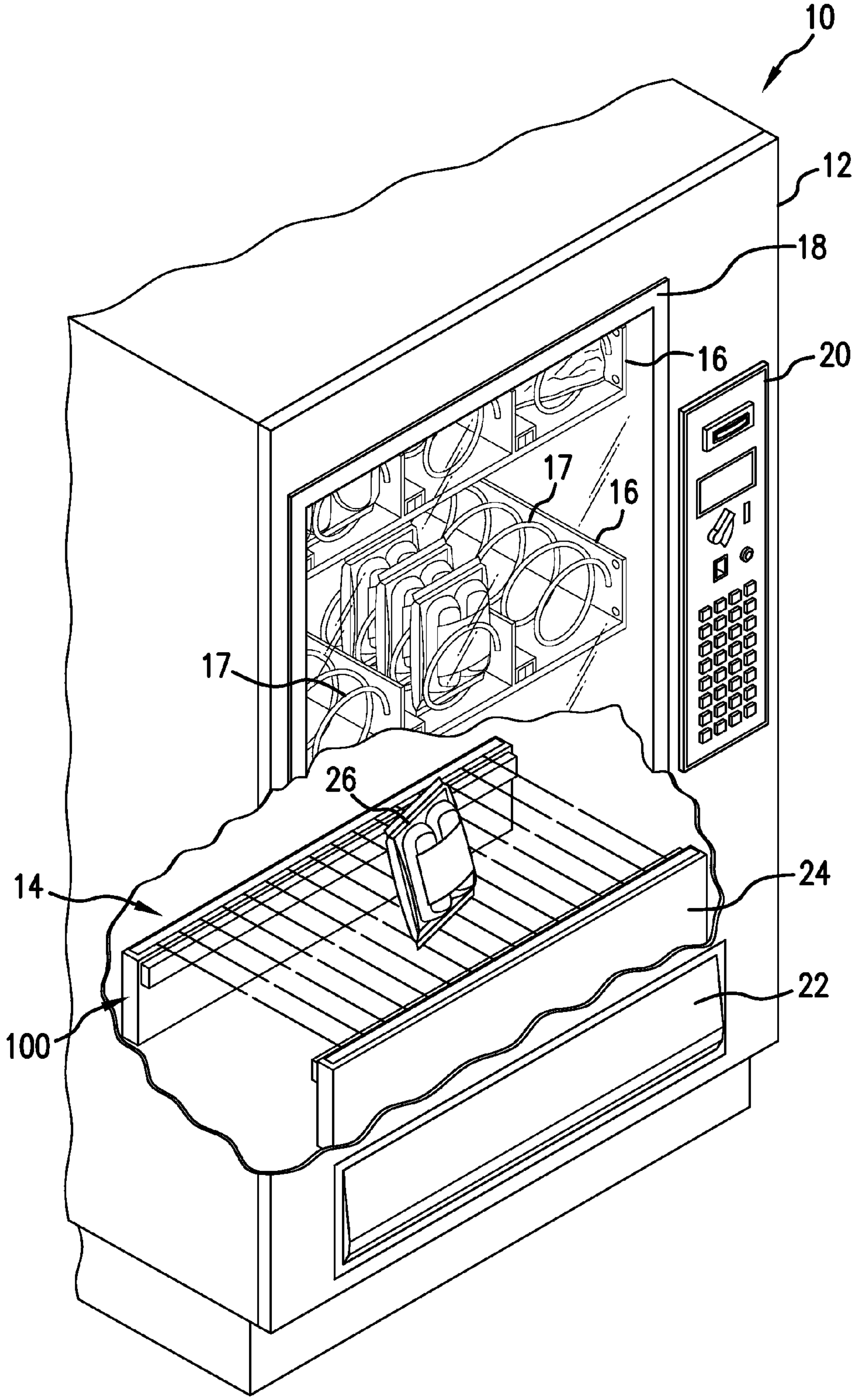
FIG. 1 shows a schematic diagram of the present invention.

FIG. 1 shows a vending machine 10 equipped with the vend-sensing system 100. In general, vending machine 10 includes a cabinet 12 having opposite sidewalls, a back wall, a top wall and a bottom wall, which cooperatively define a forwardly facing cavity 14 arranged to have a plurality of tray assemblies 16 mounted therein at a plurality of vertically spaced levels.

Vending machine 10 is equipped with a dispensing mechanism with multiple dispensing units 17 arranged across each tray assembly 16. Each tray assembly 17 may contain a plurality of motorized horizontally arranged helical spirals that are spaced from one another widthwise of the tray assembly 16, and each of which extends longitudinally in a front-to-rear depthwise direction of the tray assembly 16. Each spiral is connected to a driving chuck of a respective drive motor, which rotates the spiral about the longitudinal axis of the spiral.

Spaced in front of the front edges of the tray assemblies 16 is a door 18 that can be opened and locked. Door 18 typically has a glass front so customers can view the leading articles being offered by vending machine 10. Door 18 may further include a selector panel 20, which includes a mechanism for accepting payment from the consumer and for selecting an article 26.

After a consumer selects a desired article 26, the vending cycle may be initiated by causing the respective spiral drive motor assembly of the respective column to rotate through a sufficient angular distance, in order to advance all of articles 26 nested in the turns of the respective spiral. Articles 26 are advanced until the forward-most article 26 loses support from below as it reaches the front of the respective tray support surface and drops through a vend space 24 behind glass door 18, down into a vend hopper 22, where it can be retrieved by the consumer.

Figure 2:
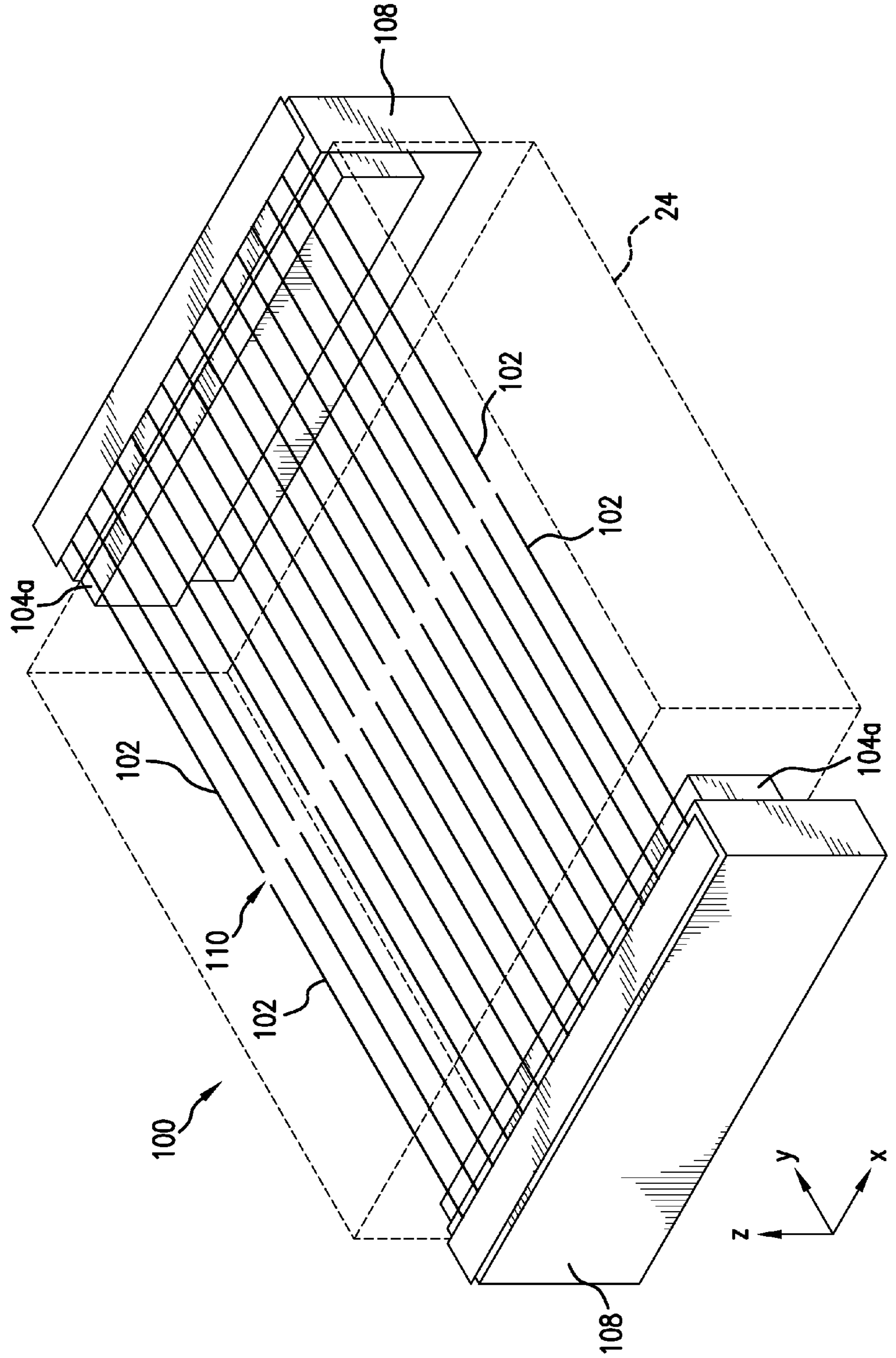
FIG. 2 shows a pattern of electromechanical sensors in a vend-sensing system.
Figure 3:
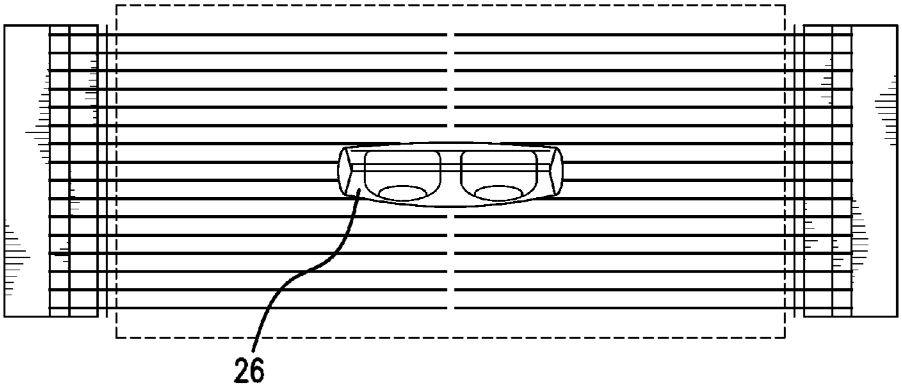
FIG. 3 shows a top view of the electromechanical sensors of FIG. 2 with a package about to impact the electromechanical sensors.
Figure 4:
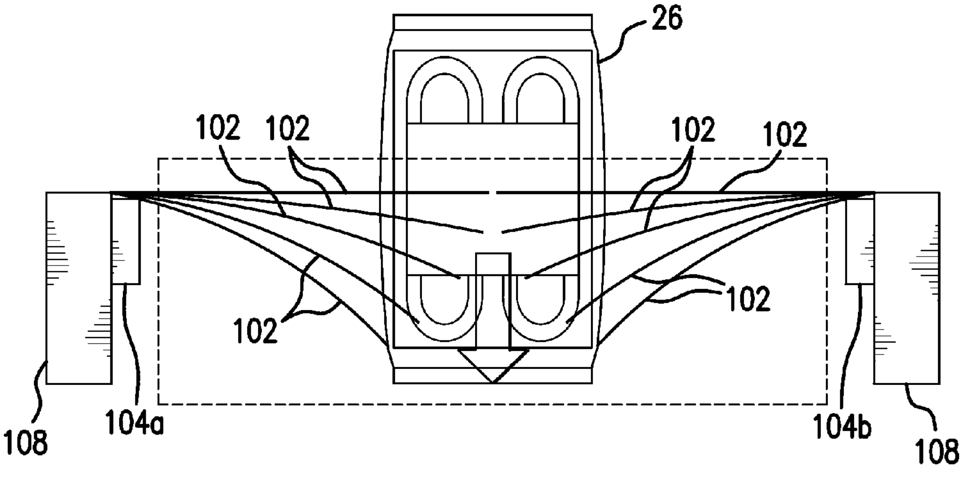
FIG. 4 shows a side view of the electromechanical sensors of FIG. 2 with a package impacting and deflecting the electromechanical sensors.

Proximate to vend hopper 22 in vend space 24, vend-sensing system 100 may be disposed to reliably detect that article 26 has actually been dispensed. FIG. 2 depicts vend-sensing system 100. As indicated in FIGS. 2-4, vend-sensing system 100 comprises a plurality of biased members 102 arranged in two rows extending longitudinally in a side-to-side direction and a plurality of rows extending latitudinaly in a depthwise front-to-back direction to substantially obstruct vend space 24. A contact strip 4*a* and 4*b* is positioned on each side of vend space 24 below biased members 102. A machine control unit 106 (shown in FIGS. 5-6) is provided to sense contact between biased members 102 and engagement strip 104.

More specifically, vend-sensing system 100 includes a frame 108 positioned on opposite sides of vend space 24. Mounted to each frame 108 is a plurality of biased members 102. Biased members 102 are arranged in two rows extending longitudinally in a side-to-side direction across each frame 108 and extend outward across vend space 24 toward the opposite side. Biased members 102 on opposite frames 108 can be aligned with each other leaving a small space 110 between opposing linear biased members that is sufficiently small to prevent article 26 from slipping through space 110 without impacting biased members 102. Biased members 102 are also spaced sufficiently close together in the longitudinal direction to prevent article 26 from slipping past without impacting biased members 102.

When article 26 is released, it falls through the vend space 24 and deflects one or more biased members 102. On impact from article 26, bias members 102 temporarily flex downward from the weight of article 26, so that article 26 may pass through the vend-sensing system 100. After article 26 passes, bias members 102 return to the extended, resting state position.

Biased members 102 are wire-like whiskers that can be fabricated from a pre-formed resilient material (e.g. spring temper steel or formed or coiled stainless steel wire) with a stiffness determined by diameter, length, spacing, material, and modulus of elasticity. Biased member 102 must be light enough to deflect sufficiently to cause a switch closure upon impact by the lightest vended article 26, but not impede the dispensing of article 26 causing a mis-vend. Bias members 102 can be spring-loaded to ensure that they extend out to the farthest length possible and quickly return to the resting state after being deflected.

Figure 7A:
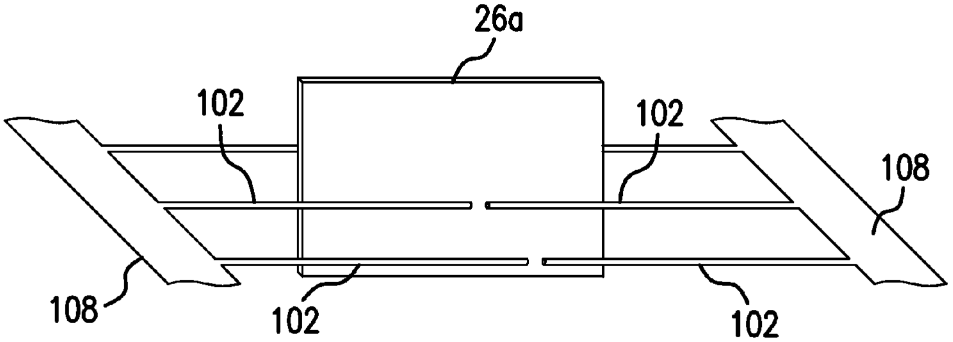
FIG. 7A is a first embodiment of a pattern of electromechanical sensors in a vend-sensing system.
Figure 7B:
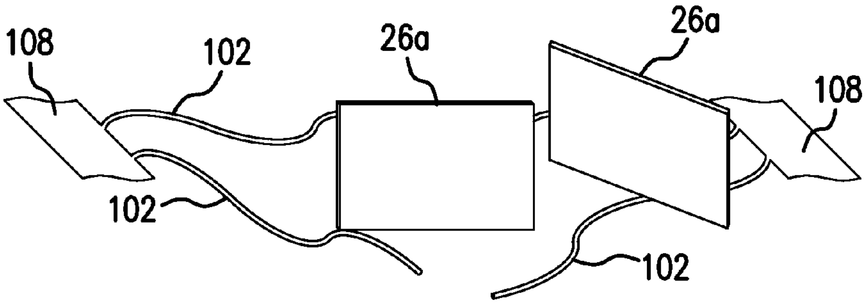
FIG. 7B is a second embodiment of a pattern of electromechanical sensors in a vend-sensing system.
Figure 7C:
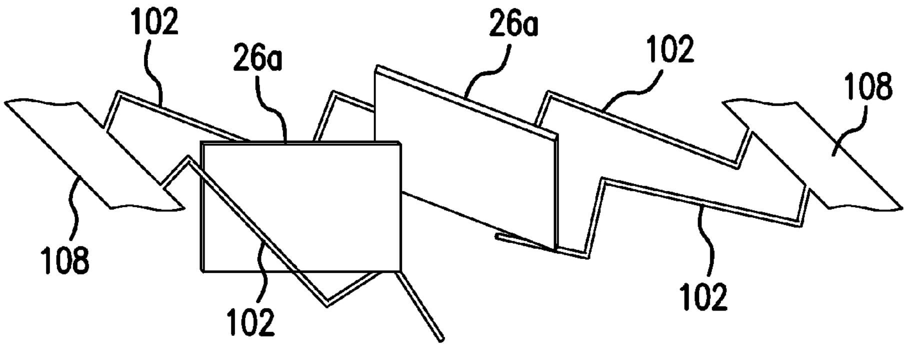
FIG. 7C is a third embodiment of a pattern of electromechanical sensors in a vend-sensing system.

Biased members 102 can be implemented in a variety of arrangements corresponding with the size of the smallest article 26 to be vended. FIG. 7 shows the embodiment illustrated in FIG. 2. As shown, a particularly small article 26, such as a merchant card 26*a*, could slip through biased members 26 that do not sufficiently cover the cross-sectional area of vend space 24. To solve this problem, biased members 102 can be shaped with gentle curves or sharp bends, as shown in FIGS. 7B and 7C, respectively. FIGS. 7B and 7C each show two merchant cards 26*a* being vended and engaging biased members 102. It is apparent that no matter the spatial orientation of merchant card 26*a* as it enters vend space 24, it will impact at least one biased member 102 and flex it downward to engage contact strip 104. This is because biased members 102 are sized to span the cross-sectional area of the vend space 24 with an inter-member spacing small enough to detect merchant card 26*a*.

Figure 7D:
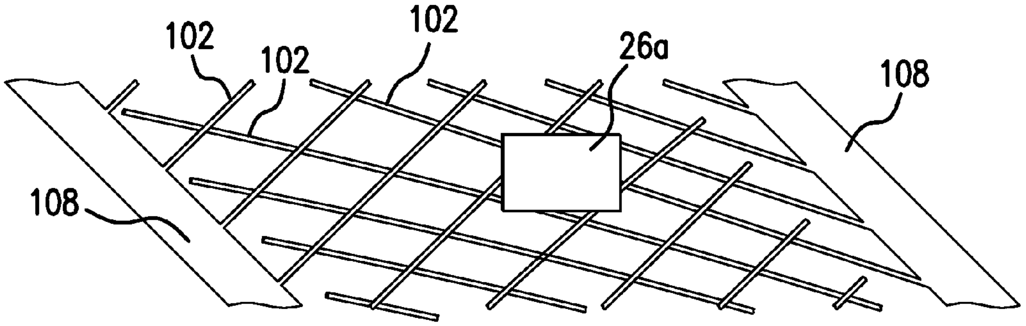
FIG. 7D is a fourth embodiment of a pattern of electromechanical sensors in a vend-sensing system.

Alternatively, biased members 102 can be arranged on top of each other, as shown in FIG. 7D, and slide apart from the weight of article 26. Similarly, biased members 102 are sized to span the cross-sectional area of the vend space 24 with an inter-member spacing small enough to detect merchant card 26*a*.

Contact strip 104 is combined to each frame 108 and positioned beneath biased members 102. When biased member 102 is deflected downward from the weight of article 26, it touches contact strip 104. FIG. 4 shows a pair of opposing biased members 102 flexing downward from the weight of article 26. At the maximum deflection, biased member 102 touches contract strip 104.

Figure 5:
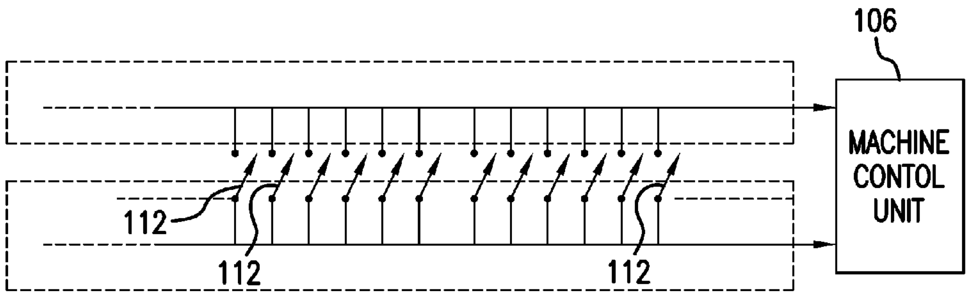
FIG. 5 is a schematic diagram of the electromechanical switches in the open position.
Figure 6:
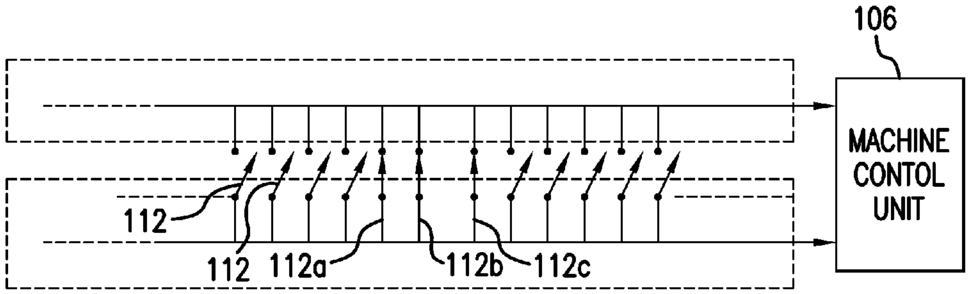
FIG. 6 is the schematic diagram of FIG. 5 with three of the electromechanical switches closed to indicate that a package has deflected the electromechanical sensors corresponding to the closed switches.

Turning to FIGS. 5 and 6, a circuit diagram illustrates the closing of switches 112, which schematically represent biased members 102 and contact strip 104. Switches 112 are each normally open and independent of each other to correspond with biased member 102 being in a resting state. When biased member 102 is flexed downward from the weight of article 26 it temporarily touches contact strip 104 to close the electrical circuit. FIG. 5 shows all of switches 112 in an open position. FIG. 6 shows three switches 112*a*, 112*b*, and 112*c* in the closed position indicating that the weight of article 26 has sufficiently deflected biased member 102 to engage contact strip 104 to temporarily close the electrical circuit.

Biased members 102 are optimally connected to the chassis ground or zero potential voltage of vending machine 10, with a positive potential, signal voltage applied to contact strip 104. For additional "fail safe" operation, the two rows of biased members 102 shown in FIG. 2 may be electrically isolated and applied as two switch closures to controller 106. In the event that biased member 102 on one side becomes permanently shorted to contact strip 104, its corresponding biased member 102 on the other side will continue normally to sense articles 26.

Switches 112 are electrically coupled to machine controller 106. Controller 106 monitors and ensures the proper operation of the vending machine 10. Machine controller 106 communicates with the vending drive motors (controlling spiral rotations) of dispensing unit 17. A debounce circuit can be used by controller 106 to smooth what is normally expected to be an erratic closure-time pattern during the brief interval as article 26 falls and deflects biased members 102 downward to engage contact strip 104.

Machine controller 10 includes logic and associated circuitry to interface and communicate with vend-sensing system 100 and dispensing unit 17. Such logic may include, for example, a processor with executable instructions. The software and hardware implementing machine controller 106 can be implemented in many different embodiments of software, firmware, and hardware. The actual software code or specialized control hardware used to implement the present invention is not limiting of the present invention.

If, during the vending cycle, machine controller 106 does not register that article 26 has been dispensed, machine controller 106 may initiate a corrective action. Such corrective action may include, for example, communicating with selector panel 20 to notify the consumer that he is given the choice to have his form of payment refunded or to select another column's article 26. For example, if machine controller 106 does not register that a selected article 26 has been dispensed because a spiral pocket was left empty or the selected article 26 is stuck, machine controller 106 may communicate with selector panel 20 to display a message that the consumer may select another article 26. In this manner, vend-sensing system 100 will ensure that vending machine 10 will either properly vend an article 26 or perform a corrective action to avoid mis-vending.

While the present invention has been particularly shown and described with reference to exemplary embodiments thereof, it should be understood by those of ordinary skill in the art that various changes, substitutions and alterations can be made herein without departing from the scope of the invention as defined by appended claims and their equivalents.

What is claimed is:

1. An electromechanical vend-sensing system for a vending machine having a dispensing mechanism configured to initiate upon selection by a consumer vending operations and dispense an article into a vend space through which the article falls, the vend-sensing system comprising:

at least one biased member mounted on a side of the vend space having a first potential voltage;

a contact strip positioned beneath the at least one biased member having a second potential voltage; and a controller circuit that senses when the biased member contacts the contact strip.

2. The vend-sensing system of claim 1, wherein the biased member is flexed downward from a resting state by a weight of the article and returns to the resting state after the article moves past the biased member, and wherein the biased member touches the contact strip when it is flexed downward.

3. The vend-sensing system of claim 1, and further comprising a plurality of biased members arranged in a row across the vend space.

4. The vend-sensing system of claim 3, and further comprising a plurality of contact strips, wherein each one of the plurality of contact strips is positioned beneath each one of the plurality of biased members.

5. The vend-sensing system of claim 1, and further comprising a plurality of biased members arranged in two rows across the vend space.

6. The vend-sensing system of claim 5, and further comprising a plurality of contact strips, wherein each one of the plurality of contact strips is positioned beneath each one of the plurality of biased members.

7. The vend-sensing system of claim 1, wherein the first potential voltage is ground and the second potential voltage is positive.

8. The vend-sensing system of claim 1, wherein the vend space comprises a first side and a second side, and the vend-system further comprises at least one biased member combined to the first side of the vend space and at least one biased member combined to the second side of the vend space, wherein the biased member combined to the first side of the vend space extends across a portion of the vend space towards the second side and the biased member combined to the second side of the vend space extends across a portion of the vend space towards the first side so that the vend space is substantially obstructed by the biased members.

9. The vend-sensing system of claim 8, wherein the biased members are straight.

10. The vend-sensing system of claim 8, wherein the biased members are bent.

11. The vend-sensing system of claim 8, wherein the biased members are arranged in an overlapping pattern.

12. A vending machine, comprising:

a dispensing unit having a plurality of article containment regions and configured to perform vending operations and dispense an article through a vend space;

a payment selection unit configured to communicate with the dispensing unit to initiate vending operations after a consumer has selected an article and satisfied payment for said selected article; and an electromechanical vend-sensing system configured to communicate with the dispensing unit, the vend-sensing system including at least one biased member mounted on a side of the vend space having a first potential voltage, a contact strip positioned beneath the at least one biased member having a second potential voltage, and a controller circuit that senses when the biased member contacts the contact strip.

13. The vending machine of claim 12, wherein the vend space comprises a first side and a second side, and the vend-system further comprises at least one biased member combined to the first side of the vend space and at least one biased member combined to the second side of the vend space, wherein the biased member combined to the first side of the vend space extends across a portion of the vend space towards the second side and the biased member combined to the second side of the vend space extends across a portion of the vend space towards the first side so that the vend space is substantially obstructed by the biased members.

14. The vending machine of claim 13, wherein the biased member is flexed downward from a resting state by a weight of the article and returns to the resting state after the article moves past the biased member, and wherein the biased member touches the contact strip when it is flexed downward.

15. The vending machine of claim 14, and further comprising a plurality of biased members combined to the first side of the vend space and a plurality of biased members combined to the second side of the vend space.

16. The vending machine of claim 15, wherein the first potential voltage is ground and the second potential voltage is positive.

17. An electromechanical vend-sensing system for a vending machine having a dispensing mechanism configured to initiate upon selection by a consumer vending operations and dispense an article into a vend space having a first side and a second side through which the article falls, the vend-sensing system comprising:

at least one biased member combined to the first side of the vend space and at least one biased member combined to the second side of the vend space, wherein the biased member combined to the first side of the vend space extends across a portion of the vend space towards the second side and the biased member combined to the second side of the vend space extends across a portion of the vend space towards the first side so that the vend space is substantially obstructed by the biased members;

the at least one biased member combined to the first side of the vend space and the least one biased member combined to the second side of the vend space are each at a ground potential voltage;

a contact strip having a positive potential voltage positioned beneath each one of the at least one biased member combined to the first side of the vend space and the least one biased member combined to the second side of the vend space; and a controller circuit that senses when the biased member contacts the contact strip.

18. The vend-sensing system of claim 17, and further comprising a plurality of biased members combined to the first side of the vend space and a plurality of biased members combined to the second side of the vend space, wherein the biased members are flexed downward from a resting state by a weight of the article and returns to the resting state after the article moves past the biased members, and wherein the biased members touches the contact strip when it is flexed downward.

19. The vend-sensing system of claim 18, wherein the controller initiates a corrective action in response to a predetermined period of time lapsing after the dispensing mechanism initiates the vending operations.

20. The vend-sensing system of claim 19, and further comprising the vending machine.

* * * * *